Figure 1:
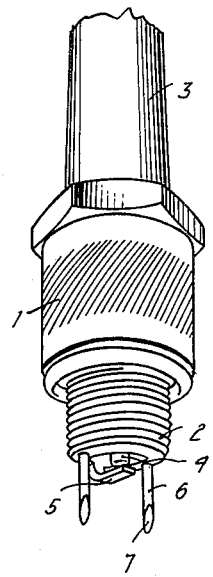

March 2, 1965  I. S. VIDAL  3,171,396
DEVICE FOR REMOVING ELECTROSTATIC CHARGES FROM
GASES, PARTICULARLY FROM THE INTAKE GASES
IN INTERNAL COMBUSTION ENGINES
Filed Nov. 8, 1961

INVENTOR.
Ignacio Sapaier Vidal
BY Michael S. Striker
Attorney

United States Patent Office 3,171,396
Patented Mar. 2, 1965

3,171,396
DEVICE FOR REMOVING ELECTROSTATIC CHARGES FROM GASES, PARTICULARLY FROM THE INTAKE GASES IN INTERNAL COMBUSTION ENGINES
Ignacio Sagnier Vidal, Calle Raset 37, Barcelona, Spain
Filed Nov. 8, 1961, Ser. No. 150,924
Claims priority, application Spain, Nov. 18, 1960, 262,976
1 Claim. (Cl. 123—169)

The invention relates to a device for removing electrostatic charges which originate in some gases or vapours in motion, particularly when these circulate through pipes or conduits, as happens, for example, in the intake gases in internal combustion engines. The electrostatic charges may have been acquired either by the gases rubbing against the conduits or by the rubbing of molecules of the gases against one another.

In particular, as regards the intake gases in petrol engines, the fuel and air become electrically charged in the carburettor by friction with the conduits and until they finally reach the cylinder, they continue to acquire further charges by friction against the walls or by the friction between the molecules themselves.

The invention has among its objects to eliminate this disadvantage. The invention consists essentially in placing in the intake conduit and near the combustion chamber a plurality of conducting sharp needles fixed on or integrated with the metal parts of the engine, their ends being conveniently disposed so as to affect a complete section of the passage of the gases. In this way, the electrostatic charges are led through the needles to the whole mass of the engine and an electrostatic equilibrium is attained, so that the gases reach the compression and combustion stages in their best condition.

The aforesaid sharp needles can be arranged at various positions depending on how the engine is built, even inside the combustion chamber and also in the spark plugs. In all cases, however, their specific mission is to lead away the charges from the intake gases or vapours towards the metallic parts enveloping them.

It will be understood that these needles may take different forms without, nevertheless, falling outside the scope of the invention. Thus, they may be:

(a) Needles of different lengths, fixed on or integrated with the metal parts of the engine, with their ends placed in the mass of the circulating gases or vapours. These needles may be placed even inside the combustion chamber.

(b) Fine needles or wires, fixed on or integrated with the spark plugs, with their ends in contact with the gases which are compressed and ignited in the internal combustion engines.

Figure 2:
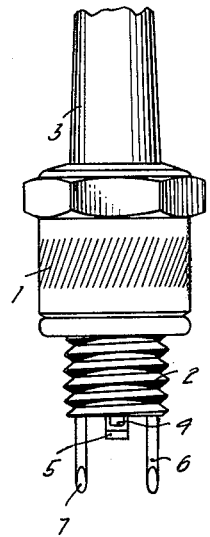

One construction of the invention in its application to a spark plug for an internal combustion engine is diagrammatically illustrated by way of example in the accompanying drawings, in which:

FIGURE 1 shows a partial lower isometric view of a spark plug constructed according to the invention, and
FIGURE 2 is a side elevation.

In the drawings the spark plug is shown as a conventional type provided with a metal body 1 having a screw-threaded neck 2 and a central insulator 3 carrying the inner electrode 4 which cooperates with the outer electrode 5 secured on the body 1 to provide the initial spark.

Two metal wires 6 with pointed ends 7 are secured as, for example, by a pressure fitting into holes suitably drilled on the edges of the metal body 1. The pointed ends 7 do not take any part in the ignition but serve merely as means for picking up the static charges formed in the mixture admitted to the cylinder.

I claim:

Means for removing the electrostatic charges from gases such as the intake gases of internal combustion engines, comprising a plurality of electrically conducting sharp-ended needles mounted on the spark plug of the engine.

References Cited by the Examiner
UNITED STATES PATENTS

| | | | |
|---|---|---|---|
| 1,264,548 | 4/18 | Nicolaysen | 123—169 |
| 1,928,299 | 9/33 | Minter | 123—191 |
| 1,939,302 | 12/33 | Heaney | 123—119 |

FOREIGN PATENTS 959,669  10/49  France.

OTHER REFERENCES

Internal Combustion Engines, by Lichty—6th Edition; McGraw Hill Book Co., 1951, New York; TJ755L5 C2.

RICHARD B. WILKINSON, Primary Examiner.
RALPH H. BRAUNER, Examiner.